(12) United States Patent
Dua et al.

(10) Patent No.: US 10,409,820 B2
(45) Date of Patent: Sep. 10, 2019

(54) SEMANTIC MAPPING OF FORM FIELDS

(71) Applicant: Adobe Inc., San Jose, CA (US)

(72) Inventors: Varun Dua, Bangalore (IN); Deepak Kumar, Noida (IN)

(73) Assignee: Adobe Inc., San Jose, CA (US)

( * ) Notice: Subject to any disclaimer, the term of this patent is extended or adjusted under 35 U.S.C. 154(b) by 186 days.

(21) Appl. No.: 15/708,370

(22) Filed: Sep. 19, 2017

(65) Prior Publication Data
US 2019/0087463 A1 Mar. 21, 2019

(51) Int. Cl.
| | | |
|---|---|---|
| *G06F 17/30* | (2006.01) | |
| *G06F 16/2457* | (2019.01) | |
| *G06F 16/25* | (2019.01) | |
| *G06F 16/23* | (2019.01) | |
| *G06F 16/93* | (2019.01) | |
| *G06F 16/9535* | (2019.01) | |
| *G06F 17/24* | (2006.01) | |
| *G06F 17/27* | (2006.01) | |

(52) U.S. Cl.
CPC .... *G06F 16/24575* (2019.01); *G06F 16/2379* (2019.01); *G06F 16/252* (2019.01); *G06F 16/93* (2019.01); *G06F 16/9535* (2019.01); *G06F 17/243* (2013.01); *G06F 17/248* (2013.01); *G06F 17/2785* (2013.01)

(58) Field of Classification Search
CPC .... G06F 17/243; G06F 16/93; G06F 17/2785; G06F 16/24575; G06F 16/9535; G06F 17/248; G06F 17/2705
USPC ........ 707/602, 811, 754, E17.008, E17.108; 715/222, 224, 221, 226
See application file for complete search history.

(56) References Cited

U.S. PATENT DOCUMENTS

| | | | | |
|---|---|---|---|---|
| 9,727,548 | B2* | 8/2017 | Watanabe | G06F 16/93 |
| 2005/0289114 | A1* | 12/2005 | Bellamy | G06F 16/2428 |
| 2007/0130134 | A1* | 6/2007 | Ramsey | G06F 17/243 |
| 2008/0120257 | A1* | 5/2008 | Goyal | G06F 17/243 706/12 |
| 2012/0226969 | A1* | 9/2012 | Begole | G06F 17/243 715/226 |
| 2017/0052940 | A1* | 2/2017 | Allen | G06F 17/2785 |
| 2017/0177715 | A1* | 6/2017 | Chang | G06F 17/2785 |

* cited by examiner

*Primary Examiner* — Dangelino N Gortayo
(74) *Attorney, Agent, or Firm* — Finch & Maloney PLLC

(57) ABSTRACT

Electronic form generation techniques are disclosed which automatically generate an electronic form based on a paper form by semantically mapping form fields. An example method may include identifying a data field in a paper form, extracting a semantic meaning of the data field, searching multiple data elements to identify a data element that semantically matches the data field, and, responsive to identifying a semantically matching data element, generating a data field in the electronic form based on the semantically matched data element and the associated one or more digital data capture constructs. Each data element may have associated therewith one or more digital data capture constructs. The generated data field in the electronic form corresponds to the data field in the paper form.

20 Claims, 5 Drawing Sheets

SEMANTIC MAPPING OF FORM FIELDS

FIELD OF THE DISCLOSURE

This disclosure relates generally to electronic forms, and more particularly, to techniques for generating electronic forms from paper forms by semantically mapping form fields.

BACKGROUND

A form is a document with data fields or spaces into which data or information is to be entered. For example, a person can complete a paper form by writing or entering information into the fields of the form. Many government and business organizations rely on the use of paper forms for their data capture and management needs. With the onset of the digital age, organizations that rely on paper forms are feeling increasing pressure to convert to the use of electronic forms for their data capture and management needs. As part of this conversion, these organizations are also under pressure to provide users of their forms a rich user experience. However, current solutions for converting paper forms to electronic forms fail to generate electronic forms that provide users the desired data capture experience.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

Figure 1:
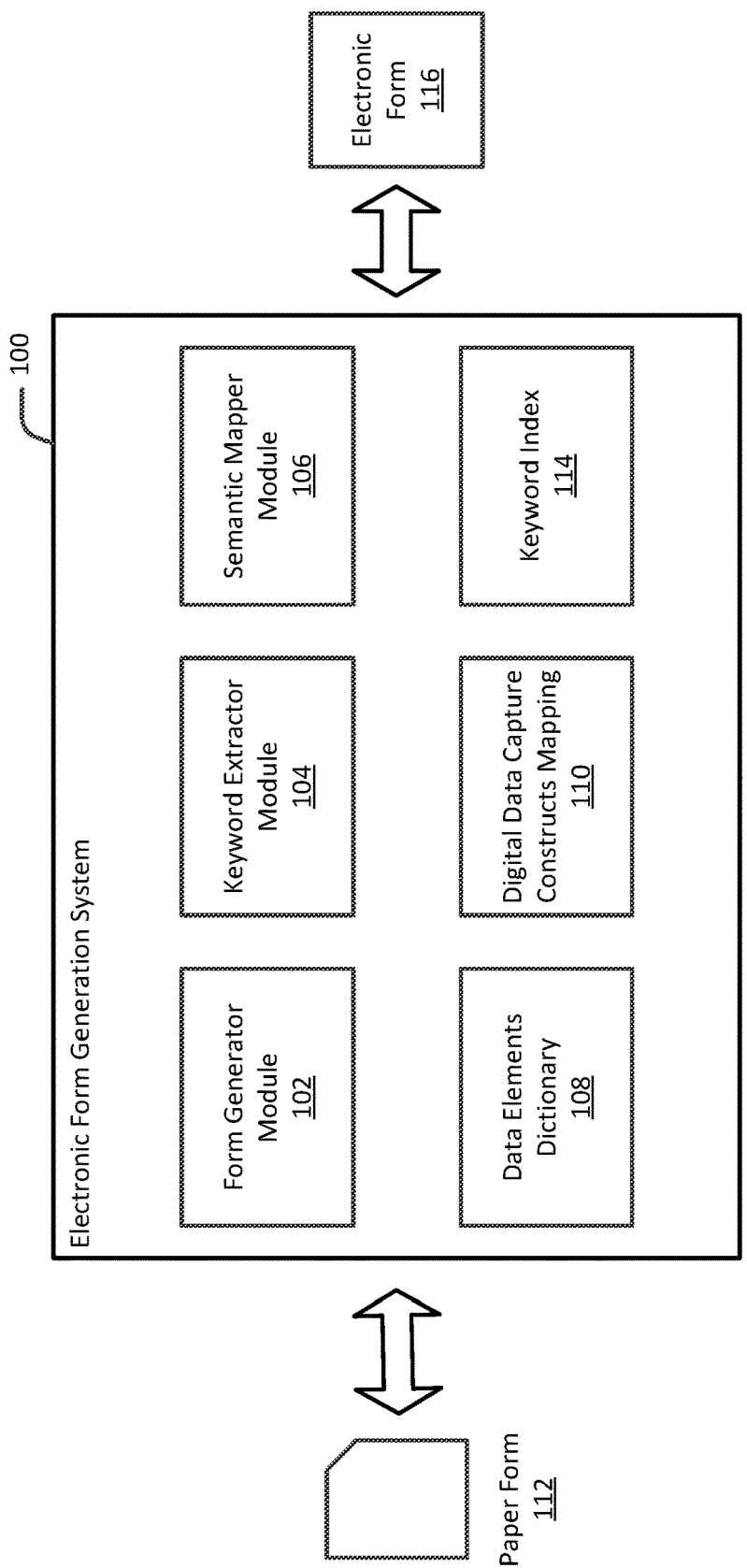
FIG. 1 illustrates selected components of an example electronic form generation system, in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Mobile and digital channels being a key component of the services and offerings in the digital era, organizations that have traditionally relied on offline channels for enrolling in or obtaining their services and offerings are under pressure to create digital experiences for their customers. Digital data capture can be considered a key and usually first component of the process of going online from the offline. A typical process for converting offline data capture forms (e.g., paper forms) to online experiences (e.g., electronic forms) may involve converting the content of the paper forms (e.g., field captions, widgets, instructions, etc.) to digital content in electronic forms. This conversion is conducted one form at a time, typically using available paper form to digital form conversion tools. However, as previously noted, electronic forms generated using available conversion tools fail to provide users of these electronic forms a rich data capture experience. For example, an electronic form generated by available conversion tools is typically a digital image of the paper form that is editable. Once an electronic form is generated in this manner, a person or persons having knowledge of the paper form and the conversion tool manually generates a fillable electronic form from the editable digital image. For example, the conversion tool may allow a user to manually create text entry data fields in the electronic form by selecting the image of the field in the electronic form. Some conversion tools may also allow the user to further customize the data fields (e.g., apply experience constructs or business rules). Considering the scale of the conversion, for example, conversion of hundreds and even thousands of paper forms, this modification of individual data fields per electronic form to implement the desired experience constructs and business rules is a huge, time consuming, repetitive, and error prone process.

To this end, techniques are disclosed herein for enabling the automatic generation of electronic forms that include data fields having associated therewith user experience constructs and/or business rules. The user experience constructs and/or business rules attached to or associated with the data fields in the electronic forms provide users of the electronic forms a rich and improved data capture experience. Automatic generation of such electronic forms may be achieved by creating and using a data elements dictionary or schema that contains data elements that are configured to provide the rich or improved data capture experience. A data element may be applicable in the context of forms in that the data element may be a region of an electronic form, such as a form field or data field, where data may be entered into the electronic form. Attached to or associated with each data element in the data elements dictionary may be one or more digital data capture constructs. The digital data capture constructs may include user experience constructs (e.g., form object, user interface control, widget, tooltips, help text, field-specific styling, captions, and the like) and/or business rules (e.g., calculation formulas, validation rules, etc.). An electronic form that includes data fields to which the user experience constructs and/or business rules are pre-attached may be generated by schematically matching (e.g., mapping) the data fields in a paper form to the data elements in the data elements dictionary, and generating the corresponding data fields in the electronic form based on the matched data elements, including the user experience constructs attached to the data elements.

By way of example, the data elements dictionary may contain a data element for a data field "Social Security Number", which is attached to five digital data capture constructs. The first digital data capture construct being a user experience construct that specifies a form object for a combo box for 9 characters. The second digital data capture construct being another user experience construct for a help text that explains what information is being requested in the combo box. The third digital data capture construct being yet another user experience construct that specifies that the combo box and the label "Social Security Number" are to be in bold font. The fourth digital data capture construct being a validation rule (e.g., business rule) that checks to ensure that 9 characters are entered in the combo box. The fifth digital data capture construct being another validation rule (e.g., business rule) that checks to ensure that the input characters are all digits (numbers). The five digital data capture constructs mapped to the data element specify the characteristics (e.g., look and feel, usability, features, functionality, etc.) of a data field for "Social Security Number" when created in the electronic form. Accordingly, when a paper form containing a field for Social Security Number is converted to an electronic form, the data field for the Social Security Number in the electronic form will be generated based on the aforementioned five digital data capture constructs. That is, the data field for Social Security Number in the electronic form will be a combo box for 9 characters, will have help text that explains what information is being requested in this field, this field will appear in bold font, this field will have a validation rule that ensures that 9 characters are entered, and this field will have another validation rule that ensures that all 9 characters are numbers. As a result, a user completing the electronic form and, in particular, the data field for Social Security Number, will be provided a richer data capture experience as a result of the appearance of the data field, the help text that explains what information is being requested, and the elimination of data entry errors (e.g., the user will be guided to provide the correct information). This is all performed in an automated fashion, without any need for additional, specialized programming by a person. In contrast, the data field for Social Security Number in the paper form, and the digital image of the paper form, may have merely been a data field designated by a line, that appears in the same font, size and boldness as the other characters in the paper form, and without any explanation of what information is being requested in the data field. Furthermore, the paper form, and the digital image of the paper form, would not have checked the information provided in the data field for errors.

As used in this disclosure, the term "user experience construct" refers to a characteristic of a form data field that a user experiences and/or encounters when using and/or completing the data field. Examples of user experience constructs may include form objects (e.g., suitable user interface elements capable of collecting data or information, such as text fields, hidden fields, combo fields, buttons, check boxes, radio buttons, list menus, dropdown menus, and image fields, to name a few), user interface controls, tooltips, help text, field-specific styling, captions, and the like. The user experience constructs provide the characteristics (e.g., user friendly, visually stimulating, etc.) that provide users interacting with the data field a rich and improved interaction experience as compared to a corresponding field in a paper form (or digital image of the paper form).

As used in this disclosure, the term "business rule" refers to a characteristic of a form data field that is directed to the proper operation or functionality of the data field, including the information input or provided to the data field. Examples of business rules may include calculation formulas, validation rules, rule to capitalize the information (e.g., value) provided by a user in the data field, action or actions to perform on a click of a button or on completing the data field by a user (e.g., validate the contents of the form), and the like. A calculation rule for a data field may specify a calculation that is performed using the input to the data field. A business rule for a data field may check the input provided in the data field for correctness. For example, a business rule for an "Area Code" data field may check to confirm that exactly three numbers are input into the data field, and generate an error message in the instance where three numbers are not input into the data field. As another example, a business rule for a "Zip Code" data field may check to confirm that a valid zip code is input into the data field, and generate an error message in the instance where something other than a valid zip code is input into the data field.

As used in this disclosure, the term "digital data capture construct" refers a user experience construct or a business rule. Accordingly, digital data capture constructs include one or more user experience constructs and/or one or more business rules. In general terms, the digital data capture constructs associated with a data field (e.g., a data element in the data elements dictionary) specify the characteristics (e.g., look and feel, usability, features, functionality, etc.) of the data field when the data field is created in the electronic form.

In some embodiments, a computer-implemented method to automatically generate an electronic form based on a paper form may include identifying a current data field to process in the paper form, and extracting a semantic meaning of the current data field. In some embodiments, a form generator module may identify the current data field to process. For example, the paper form may be pre-processed to identify the data fields, and the corresponding captions, that are included in the paper form using suitable technologies, such as optical character recognition (OCR). A list of the data fields, and the associated captions, can then be provided to the form generator module. The form generator module may identify the current data field to process from the provided list of data fields. Alternatively, the form generator module may traverse each data field in a paper form to identify a current data field (e.g., one of the data fields in the paper form) to process. In some embodiments, the form generator module may also determine a context associated with the identified current data field in the paper form. The caption of the identified current data field (e.g., a data field label, an explanation of the data field, etc.) and/or the contextual information may be provided or otherwise made available to a semantic mapper module. The semantic mapper module may determine or extract the semantic meaning of the identified current data field based on the caption of the identified current data field and, in some embodiments, the contextual information associated with the identified current data field. The method may also include searching a data elements dictionary to identify a data element that matches the semantic meaning of the identified current data field. The data elements dictionary may include the data elements having associated therewith the digital data capture constructs as described in the various embodiments. In some embodiments, the semantic mapper module may search the data elements dictionary for a matching data element (a data element that matches the semantic meaning of the identified current data field). If the search results in identification of a matching data element, the identified data element (e.g., an indication of the identified data element) may be provided or otherwise made available to the form generator module. The form generator module may generate a data field in the electronic form based on the identified data element and the one or more digital data capture constructs associated with the identified data element. The generated data field in the electronic form, with the associated one or more digital data capture constructs, corresponds to the current data field that is being processed in the paper form.

In some embodiments, the generated data field in the electronic form may differ from the corresponding data field in the paper form. As an example, the data field in the electronic form may have three text entry fields, one each for first name, last name, and middle initial, even though the paper form includes a single data field for inputting the name. Moreover, the data field generated in the electronic form may also have help text that explains what is being requested, and may support keyboard, mouse, and audio input, as specified by the digital data capture constructs. As a result, the generated electronic form provides a richer and improved data capture experience as compared to the corresponding paper form. In some instances, the generated data field in the electronic form may differ from the corresponding data field in the paper form in certain aspects, but be similar in other aspects. As an example, the data field in the electronic form may have the same label or title as the corresponding data field in the paper form, but may include one or more aspects, such as user experience constructs and/or business rules, that are not present in the paper form.

In some embodiments, a user, such as an organization, may provide the digital data capture constructs for the data elements for use in generating the electronic forms. The user-provided digital data capture constructs may be exclusive to the user in that the user-provided data elements are to be used in generating electronic forms of the user. Additionally or alternatively, the user-provided digital data capture constructs may be non-exclusive in that the user-provided digital data capture constructs may also be used in generating electronic forms of other users. For example, the user may specify or indicate that one or more digital data capture constructs may also be used by other users.

In some embodiments, a data field included in the paper form that fails to match to a data element in the data elements dictionary may be reported to a user (e.g., a user that is converting the paper form to an electronic form). The user may then update the data elements dictionary to include a data element for the data field (the data field that resulted in the failed match). The user may additionally create and/or specify one or more digital data capture constructs for the data element (digital data capture constructs associated with the data element).

In some embodiments, a keyword index of the data elements may be generated. The keyword index of the data elements may be a mapping between the keywords (e.g., semantics) and the respective data elements. The keyword index of the data elements may be used to efficiently and comprehensively search the data elements based on the mapped keywords.

System Architecture

Turning now to the figures, FIG. 1 illustrates selected components of an example electronic form generation system 100, in accordance with at least some embodiments described herein. As depicted, electronic form generation system 100 includes a form generator module 102, a keyword extractor module 104, a semantic mapper module 106, a data elements dictionary 108, and a digital data capture constructs mapping 110. In various embodiments, additional components (not illustrated, such as processors, display, user input devices, etc.) or a subset of the illustrated components can be employed without deviating from the scope of the present disclosure. For instance, other embodiments may integrate the various functionalities of modules 102, 104, and 106 into fewer modules (e.g., one or two) or more modules (e.g., five or ten, or more). In addition, further note that the various components of system 100 may all be in a stand-alone computing system according to some embodiments, while in others, may be distributed across multiple machines. For example, each of modules 102, 104, and 106, and data elements dictionary 108 can be located in a cloud-based server arrangement, and are accessible to a client-based user interface via a communications network. In some cases, one or more of modules 102, 104, and 106 may be downloaded from a cloud-based service into the browser (or other application) of a client computer for local execution. In a more general sense, the degree of integration and distribution of the functional component(s) provided herein can vary greatly from one embodiment to the next, as will be appreciated in light of this disclosure.

Electronic form generation system 100 may be used by a user, such as an individual or an organization, to automatically generate electronic forms that provide users of the generated electronic forms a richer and improved data capture experience. The user may provide or make available to electronic form generation system 100 the paper forms that are to be converted into electronic forms. For example, electronic form generation system 100 may allow the user to provide the paper forms (e.g., one paper form at a time) for processing in real-time. Additionally or alternatively, electronic form generation system 100 may allow the user to submit one or more paper forms to be processed at a later time (e.g., batch processing).

Form generator module 102 may work in conjunction with various other modules and components of electronic form generation system 100 to facilitate the automatic generation of electronic forms that contain data fields that include user experience constructs and/or business rules that are known to provide a richer and better user experience. In some embodiments, form generator module 102 may provide a user interface, such as a graphical user interface (GUI), including graphical elements, for use in interacting with electronic form generation system 100, including form generator module 102, to convert paper forms to electronic forms. For example, using the GUI, a user can submit a request to convert a paper form to a corresponding electronic form by providing a digital image of the paper form. In some embodiments, form generation module 102 may provide an interface with which a user can upload a digital representation of a form, such as a Word document, Portable Document Format (PDF) file, XML Forms Architecture (XFA) form, etc., or provide a digital photograph of a form to convert to electronic forms.

Form generator module 102 may be configured to analyze a paper form 112 to determine the data fields that are included in paper form 112, and select one of the data fields as a current data field for processing. Form generator module 102 may identify the current data field by a caption (e.g., a data field label, an explanation of the data field, etc.) associated with the current data field. In some embodiments, form generator module 102 may be configured to determine or identify contextual information (e.g., a caption of a nearby data field, a description of a nearby data field, other text near the current data field, etc.) associated with the current data field. As an example, suppose the current data field has a caption "enter name", and that this data field is present near a heading "Spouse Details" in paper form 112. In this instance, form generator module 102 may determine or identify the text "Spouse Details" as the contextual information. As another example, suppose the current data field has a caption "street address", and that this data field is present near a data field with a caption "Business Email" in paper form 112. In this instance, form generator module 102 may determine or identify the data field caption "Business Email" as the contextual information. Form generator module 102 may provide or otherwise make available the identity (e.g., caption) of the current data field and/or any contextual information associated with the current data field to semantic mapper module 106.

Form generator module 102 may be configured to generate a data field in an electronic form 116 that corresponds to the current data field based on a data element that matches the current data field, and the one or more digital data capture constructs associated with the data element. Form generator module 102 may identify the digital data capture constructs associated with the data element from digital data capture constructs mapping 110. Form generator module 102 may be configured to provide error notifications during the generation of an electronic form. The error notification may be a notification to a user that is interacting with electronic form generation system 100. Additionally or alternatively, the error notification may be an entry made into an error log. For example, form generator module 102 may provide an error notification in the instance where a current data field fails to match a data element. In some embodiments, form generator module 102 may highlight or otherwise indicate the current data field that fails to match a data element for better visualization.

Keyword extractor module 104 may be configured to determine a meaning (e.g., semantics) of each data element contained in data elements dictionary 108. The meaning of a data element may be described or represented using a keyword or keywords. Keyword extractor module 104 may maintain (e.g., store) the keyword or keywords with the data element in data elements dictionary 108. In some embodiments, keyword extractor module 104 may derive the keyword or keywords for a data element from a caption or a description of the data element. For example, keyword extractor module 104 may identify the nouns in the caption or description of the data element, and use a synonym set of the base words of the nouns as a set of keywords. Techniques such as stemming, lemmatization, and synonym support, to name a few, may be used to determine the base words. In some embodiments, keyword extractor module 104 may determine the keywords from the semantics (semantic meaning) of the data element. For example, keyword extractor module 104 may build a parser using a context free natural language grammar. The grammar may include simple rules to capture all the nouns or noun phrases, or may be more complex to capture or extract additional information. Keyword extractor module 104 may use the parser to create a parse tree of the text (words) included in the description of the data element, and determine the semantics of the data element using the parse tree. Additionally or alternatively, keyword extractor module 104 may use any one of the available parsers to create the parse tree. In some embodiments, keyword extractor module 104 may derive the keywords for a data element from the digital data capture constructs associated with the data element.

In some embodiments, keyword extractor module 104 may generate a keyword index 114 of the data elements. Keyword index 114 may be a mapping between the keywords (e.g., semantics) and the respective data elements. Keyword index 114 may allow for an efficient and comprehensive search the data elements based on the meanings (semantics) of the data elements. For example, a data element for a data field "Social Security Number" may be mapped to the keywords "Social Security Number", "SSN", "What is your SSN", "What is your Social Security Number", "Tax ID Number", "Tax Identification Number", and the like. Similarly, a data element for a data field "first name" may be mapped to the keywords "first name", "name", "given name", and the like.

Semantic mapper module 106 may be configured to determine the semantic meaning of the current data field. For example, semantic mapper module 104 may determine a keyword or keywords that describe the semantic meaning of the current data field from the caption of the current data field and, in some instances, the contextual information associated with the current data field. Semantic mapper module 106 may determine the keywords or keywords in a manner similar to that described above in conjunction with keyword extractor module 104. For example, semantic mapper module 106 may determine the keywords from base words of the caption of the current data field and/or the contextual information associated with the data field. Semantic mapper module 106 may also determine the keywords using a parse tree of the text included in the caption of the current data field and/or the contextual information associated with the current data field.

In some embodiments, semantic mapper module 106 may be configured to search data elements dictionary 108 for a matching data element (a data element that matches the semantic meaning of the current data field). For example, semantic mapper module 108 may search data elements dictionary 108 for a matching data element using the keyword or keywords associated with the current data field. Semantic mapper module 108 may use word similarity measure techniques such as Wu-Palmer similarity, and the like, or simple vector based models that convert text/phrases to vectors, which may be compared or matched to determine similarity, to name a few, to determine whether there is a match. In some embodiments, semantic mapper module 106 may search keyword index 114 for a matching data element. For example, semantic mapper module 108 may search keyword index 114 using the keyword or keywords that describe the semantic meaning of the current data field. Semantic mapper module 106 may provide or otherwise make available the matching data element (e.g., the identity of the matching data element) to form generator module 102. In the instance where the search is unsuccessful (e.g., no match was found), semantic mapper module 106 may inform form generator module 102 that a match was not found.

Data elements dictionary 108 may be a repository for the data elements, including the keyword or keywords that describe each data element. Data elements dictionary 108 may be exclusive to a specific user or may be shared across different users. In some embodiments, the data elements may be existing data elements that are generally available and accessible for public use. In some instances, the data elements may have been standardized across different forms and/or different domains, such as an industry, a business, a service, government, and the like. In a more general sense, the data elements can come from any number of sources, and may be from forms specific to a particular category of forms (e.g., forms specific to an industry such as tax forms, or forms specific to an application such as job application forms, etc.) or alternatively may be from forms that cover multiple diverse applications. In some embodiments, the data elements may be unrelated or otherwise selected in an arbitrary fashion.

Digital data capture constructs mapping 110 may be a mapping between the data elements and the digital data capture constructs associated with each data element. Digital data capture constructs mapping 110 may be used to quickly and efficiently identify the digital data capture constructs that are associated with a specific data element. In some embodiments, the digital data capture constructs may be specific to a user that is converting the paper forms, or a database of digital data capture constructs maintained by or for or otherwise associated with that user. For example, in the case of the user belonging to a specific organization, some or all of the digital data capture constructs may be provided by the user and/or the specific organization to which the user belongs, or automatically selected and provided based on the identity of the user. Additionally or alternatively, some or all of the digital data capture constructs may be existing digital data capture constructs that are generally available and accessible for public use.

While various aspects and embodiments of electronic form generation system 100, including form generator module 102, keyword extractor module 104, semantic mapper module 106, data elements dictionary 108, digital data capture constructs mapping 110, and keyword index 114 have been described above with reference to FIG. 1, other aspects and embodiments will be apparent to those skilled in the art. For example, those skilled in the art will appreciate that some or all of the operations of or functions performed by one module of electronic form generation system 100 as described above may be performed by one or more other modules of electronic form generation system 100. Furthermore, the described operations and functions are only provided as examples, and some of the steps and operations and functions may be optional, combined into fewer operations and functions, or expanded into additional operations and functions without detracting from the spirit and scope of the present disclosure.

Figure 2:
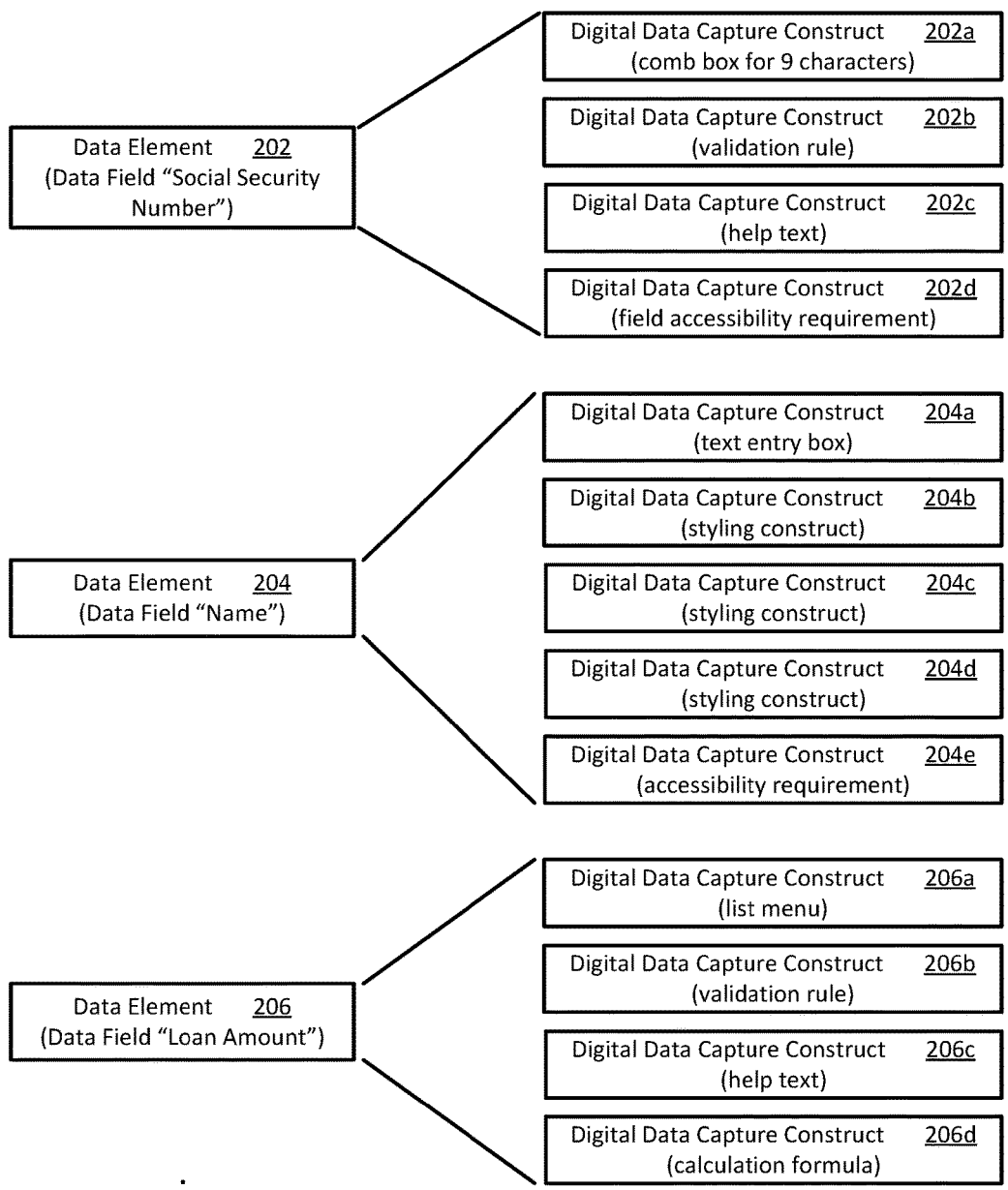
FIG. 2 illustrates example mappings of data elements and associated digital data capture constructs, in accordance with at least some embodiments described herein.

FIG. 2 illustrates example mappings of data elements and associated digital data capture constructs, in accordance with at least some embodiments described herein. For each data element, the mappings identify one or more digital data capture constructs that are associated with the data element. The digital data capture constructs may include user experience constructs, such as form objects, user interface controls, widgets, tooltips, help text, help content, error message, error text, field-specific styling, captions, accessibility requirements, and the like, and/or business rules, such as calculation formulas, validation rules, and the like.

As depicted, a data element 202 is mapped to digital data capture constructs 202a, 202b, 202c, and 202d, a data element 204 is mapped to digital data capture constructs 204a, 204b, 204c, 204d, and 204e, and a data element 206 is mapped to digital data capture constructs 206a, 206b, 206c, and 206d. For example, data element 202 is for a data field "Social Security Number"; digital data capture construct 202a is a form object for a comb box for nine characters; digital data capture construct 202b is a validation rule that checks to verify that the input to the form object is nine numbers; digital data capture construct 202c is a help text that explains what information to input into the data field; and digital data capture construct 202d is an accessibility requirement that specify the type of input mechanism that should be supported (e.g., voice input, keyboard input, biometric input, gesture input, pointing device input, and the like).

Similarly, data element 204 is for a data field "Name"; digital data capture construct 204a is a form object for a text entry box; digital data capture construct 204b is a styling construct that specifies that there should be three form objects (e.g., text entry boxes), one each for first name, middle initial, and last name; digital data capture construct 204c is a styling construct that specifies an order for the three form objects, e.g., a sequence last name, first name, and middle initial; digital data capture construct 204d is a styling construct that specifies that the data field (e.g., form objects) should appear in italics; and digital data capture construct 204e is an accessibility requirement that specify the type of input mechanism that should be supported (e.g., voice input, keyboard input, biometric input, gesture input, pointing device input, and the like). Similarly, data element 206 is for a data field "Loan Amount"; digital data capture construct 206a is a form object for a list menu that displays dollar amounts from which a selection may be made; digital data capture construct 206b is a validation rule that checks to verify that a selection is made in the list menu; digital data capture construct 206c is a help text that explains what information to input into the data field; and digital data capture construct 206d is a calculation formula that performs a calculation based on the selection made in the list menu. Although not illustrated in FIG. 2, a styling construct can also include a formatting construct that specifies a format of a data field (e.g., form object). For example, a formatting construct for data field for the inputting of a date can specify a date format, such as DD/MM/YYYY, DDMMYYY, MM/DD/YYYY, and the like, where "D" is a numeral for date, "M" is a numeral for month, and "Y" is a numeral for year.

The number of data elements and the number of digital data capture constructs mapped to each data element depicted in FIG. 2 is for illustration, and one skilled in the art will appreciate that there may be a different number of data elements and/or a different number of digital data capture constructs mapped to each data element. For example, there may be a smaller or larger, even significantly larger, number of data elements than shown. Also, the data elements may be different than those shown. Moreover, a data element may be mapped to a different number and/or different type or types of digital data capture constructs than shown. Some data elements may be mapped to the same number or different number of digital data capture constructs.

Figure 3:
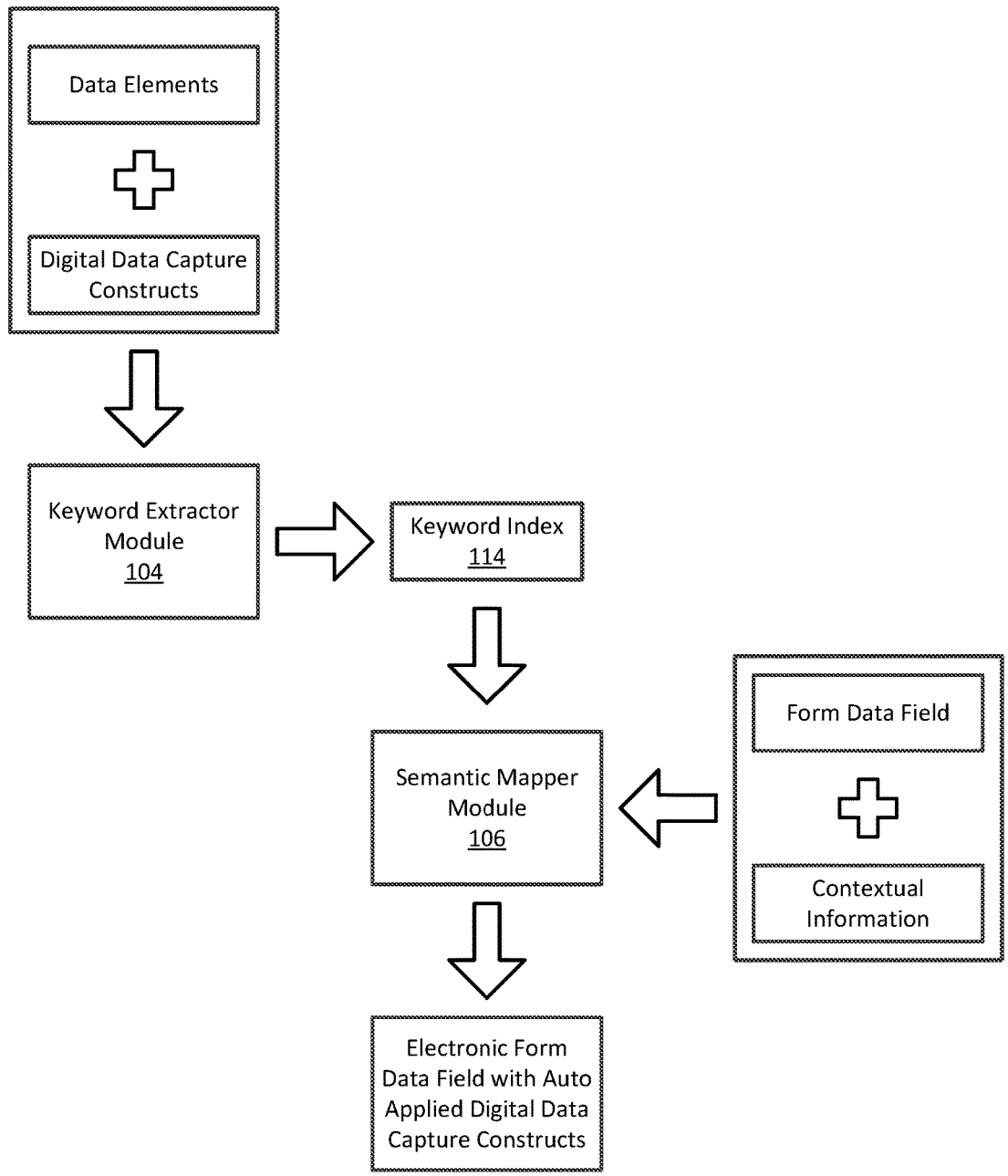
FIG. 3 illustrates example interactions between selected components of an example electronic form generation system to automatically generate an electronic form, in accordance with at least some embodiments described herein.

FIG. 3 illustrates example interactions between selected components of electronic form generation system 100 to automatically generate an electronic form, in accordance with at least some embodiments described herein. The data elements identify the fields (e.g., regions of a form where data may be entered, typically by a user) that may be created in the electronic forms. For example, one data element may be for a field for inputting a name, another data element may be for a field for inputting an address, still another data element may be for a field for inputting a phone number, and the like. Mapped to each data element are one or more digital data capture constructs. The digital data capture constructs mapped to a data element specify the characteristics (e.g., look and feel, usability, features, functionality, etc.) of the data element (i.e., data field) when created in the electronic form.

Provided the data elements and the digital data capture constructs, keyword extractor module 104 determines the meaning of each of the data elements, and represents (e.g., describes) the meaning of the data element using a keyword or keywords. For example, keyword extractor module 104 may derive the keyword or keywords from the caption or description of the data element. Keyword extractor module 104 may also derive the keywords from the digital data capture constructs mapped to the data element. In some embodiments, keyword extractor module 104 generates keyword index 114, which is a mapping between the keywords (e.g., semantics) and the respective data elements. Keyword index 114 may then be used to search the data elements based on the meanings (semantics) of the data elements.

Provided a form data field and its associated contextual information, for example, from form generator module 102, semantic mapper module 106 determines the meaning of the data field. Semantic mapper module 106 identifies or derives a set of words or phrases (e.g., keyword or keywords) that best describes the information desired in the data field. For example, semantic mapper module 106 may derive the keyword or keywords from the caption of the data field and the contextual information associated with the data field. Having derived the keywords for the data field, semantic mapper module 106 uses the keywords to search keyword index 114 for a match, and the data element mapped to the matched keyword. Accordingly, semantic mapper module 106 attempts to semantically map the data field to a data element in that a matched data element will have the same meaning (semantics) as the data field. Semantic mapper module 106 reports the matching data element, for example, to form generator module 102 for creating of a data field in the electronic form based on the matching data element and the digital data capture constructs mapped to the data element. This results in the creation of a field with automatically applied rules and experience constructs in the electronic form. In the instance where no match is found, semantic mapper module 106 may provide an indication of a failed match. In this manner, semantic mapper module 106 semantically maps each data field of the paper form to the data elements to identify data elements that semantically match (have the same meaning) as the data field in the paper form. The matching data elements, and the digital data capture constructs mapped the matching data elements, are used to generate an electronic form from the paper form (convert the paper form to an electronic form).

Figure 4:
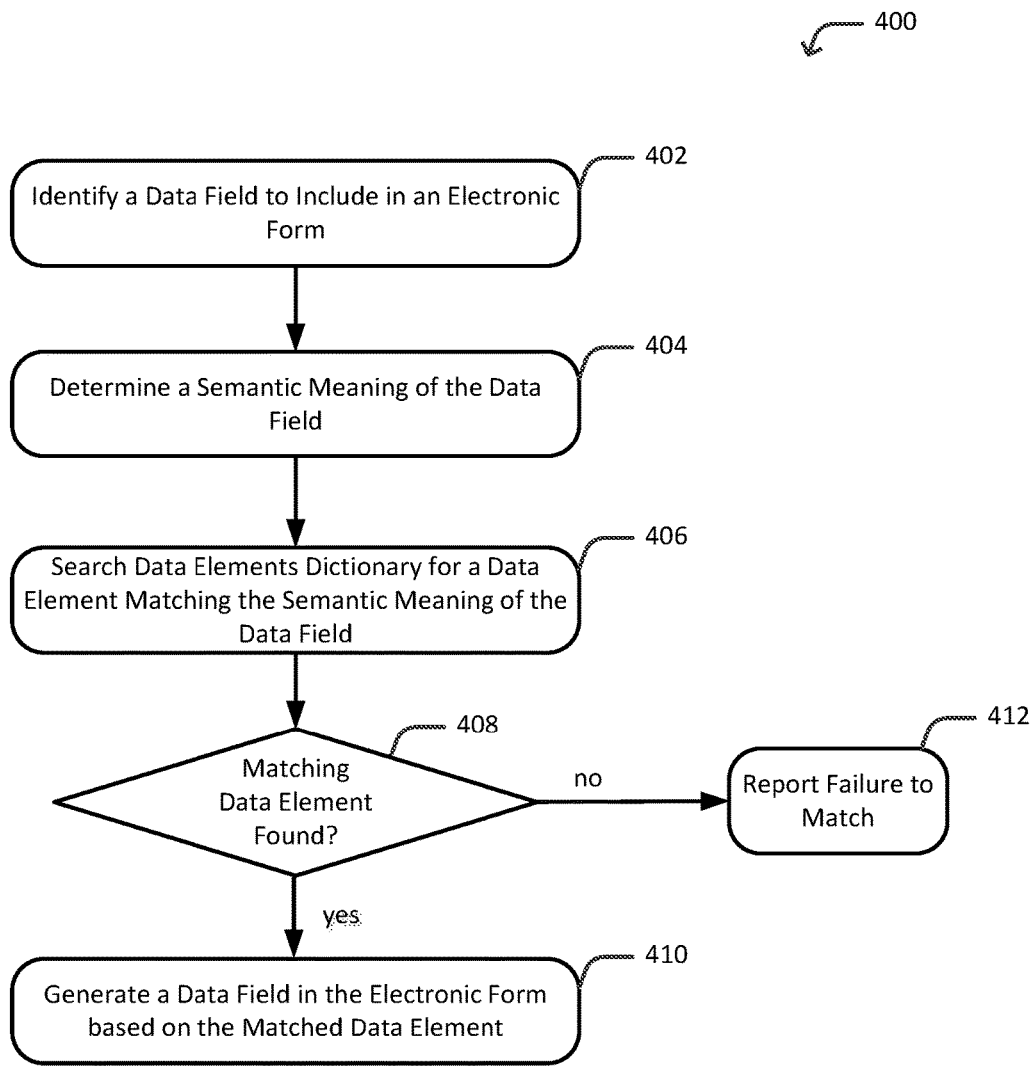
FIG. 4 is a flow diagram that illustrates an example process to automatically generate an electronic form, in accordance with at least some embodiments described herein.

FIG. 4 is a flow diagram 400 that illustrates an example process to automatically generate an electronic form, in accordance with at least some embodiments described herein. Example processes and methods may include one or more operations, functions or actions as illustrated by one or more of blocks 402, 404, 406, 408, 410, and/or 412, and may in some embodiments be performed by a computing system such as a computing system 500 of FIG. 5. The operations described in blocks 402-412 may also be stored as computer-executable instructions in a computer-readable medium, such as a memory 504 and/or a data storage 506 of computing system 500.

As depicted by flow diagram 400, the process may begin with block 402, identify a data field to include in an electronic form. For example, a user may be using electronic form generation system 100 to convert one or more paper forms to corresponding electronic forms. Form generator module 102 identifies a data field in a paper form to convert into a corresponding data field in a corresponding electronic form. Form generator module 102 provides the data field and, in some instances, contextual information associated with the data field, to semantic mapper module 106.

Block 402 may be followed by block 404, determine a semantic meaning of the data field. Semantic mapper module 106 determines the semantic meaning of the data field. For example, semantic mapper module 106 may extract a keyword or keywords that describe the data field from the description and/or contextual information of the data field.

Block 404 may be followed by block 406, search data elements dictionary for a data element matching the semantic meaning of the data field. Semantic mapper module 106 searches data elements dictionary 108 for a data element that matches (has the same meaning as) the data field. Where keyword index 114 is provided, semantic mapper module 106 uses keyword index 114 to search for a matching data element.

Block 406 may be followed by decision block 408, matching data element found? Semantic mapper module 106 determines whether a matching data element is found. If a matching data element is found, decision block 408 may be followed by block 410, generate a data field in the electronic form based on the matched data element. Semantic mapper module 106 provides the matching data element to form generator module 102, and form generator module 102 creates a form field in the electronic form based on the matching data element. That is, form generator module 102 uses the digital data capture constructs mapped to the matching data element to create the data field in the electronic form.

Otherwise, if no matching data element was found, decision block 408 may be followed by block 412, report failure to match. Semantic mapper module 106 reports the failed match to form generation module 102. Semantic mapper module 106 may additionally record the failed match in an error log. This process may iterate field by field, paper form by paper form, until the paper forms are converted to corresponding electronic forms.

Those skilled in the art will appreciate that, for this and other processes and methods disclosed herein, the functions performed in the processes and methods may be implemented in differing order. Additionally or alternatively, two or more operations may be performed at the same time. Furthermore, the outlined actions and operations are only provided as examples, and some of the actions and operations may be optional, combined into fewer actions and operations, or expanded into additional actions and operations without detracting from the essence of the disclosed embodiments.

Figure 5:
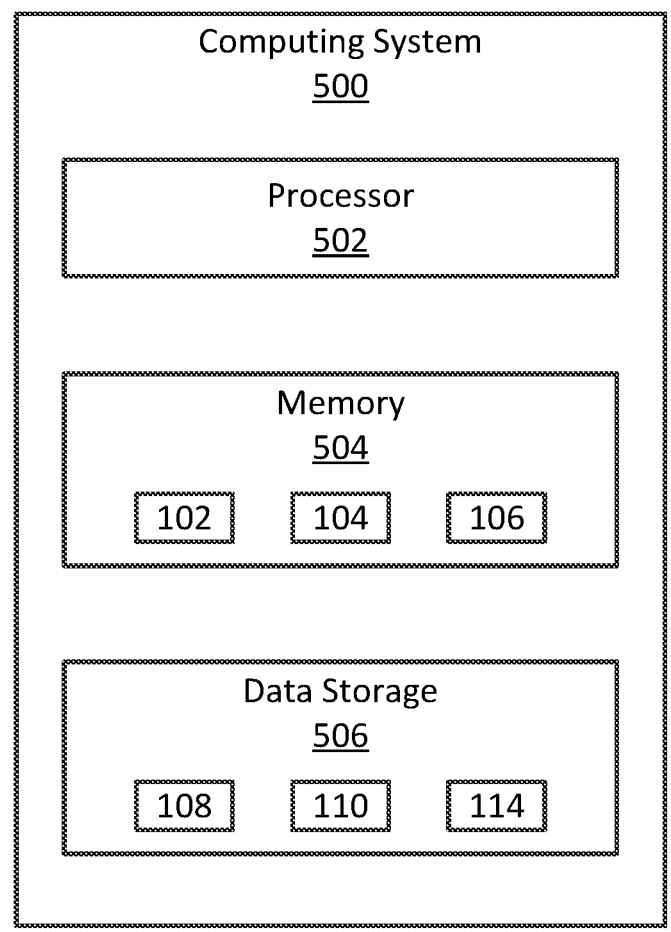
FIG. 5 illustrates selected components of an example computing system that may be used to perform any of the techniques as variously described in the present disclosure, in accordance with at least some embodiments described herein.

FIG. 5 illustrates selected components of an example computing system 500 that may be used to perform any of the techniques as variously described in this disclosure, in accordance with at least some embodiments described herein. In some embodiments, computing system 500 may be configured to implement or direct one or more operations associated with some or all of the components and/or modules associated with electronic form generation system 100 of FIG. 1. For example, form generator module 102, keyword extractor module 104, semantic mapper module 106, data elements dictionary 108, digital data capture constructs mapping 110, and keyword index 114, or any combination of these may be implemented in and/or using computing system 500. In one example case, for instance, each of modules 102, 104, and 106 is loaded in memory 504 and executable by processor 502, and data elements dictionary 108, digital data capture constructs mapping 110, and keyword index 114 is included in data storage 506. Computing system 500 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 500 may include a processor 502, memory 504, and data storage 506. Processor 502, memory 504, and data storage 506 may be communicatively coupled.

In general, processor 502 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 5, processor 502 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 502 may be configured to interpret and/or execute program instructions and/or process data stored in memory 504, data storage 506, or memory 504 and data storage 506. In some embodiments, processor 502 may fetch program instructions from data storage 506 and load the program instructions in memory 504. After the program instructions are loaded into memory 504, processor 502 may execute the program instructions.

For example, in some embodiments, any one or more of the components and/or modules of electronic form generation system 100 may be included in data storage 506 as program instructions. Processor 502 may fetch some or all of the program instructions from the data storage 506 and may load the fetched program instructions in memory 504. Subsequent to loading the program instructions into memory 504, processor 502 may execute the program instructions such that the computing system may implement the operations as directed by the instructions.

In some embodiments, virtualization may be employed in computing device 500 so that infrastructure and resources in computing device 500 may be shared dynamically. For example, a virtual machine may be provided to handle a process running on multiple processors so that the process appears to be using only one computing resource rather than multiple computing resources. Multiple virtual machines may also be used with one processor.

Memory 504 and data storage 506 may include computer-readable storage media for carrying or having computer-executable instructions or data structures stored thereon. Such computer-readable storage media may include any available media that may be accessed by a general-purpose or special-purpose computer, such as processor 502. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 502 to perform a certain operation or group of operations.

Modifications, additions, or omissions may be made to computing system 500 without departing from the scope of the present disclosure. For example, in some embodiments, computing system 500 may include any number of other components that may not be explicitly illustrated or described herein.

As indicated above, the embodiments described in the present disclosure may include the use of a special purpose or a general purpose computer (e.g., processor 502 of FIG. 5) including various computer hardware or software modules, as discussed in greater detail herein. Further, as indicated above, embodiments described in the present disclosure may be implemented using computer-readable media (e.g., memory 504 of FIG. 5) for carrying or having computer-executable instructions or data structures stored thereon.

A number of benefits associated with some embodiments of the present disclosure will be appreciated. For example, as one of many benefits, in some embodiments, the techniques accelerate the time to value creation of electronic forms (e.g., conversion of paper forms to electronic forms) by automating the application of the rules and experience constructs to the electronic form fields. The value is further realized by using a semantic mapping of the form fields to identify the rules and experience constructs. Additionally, the techniques promote the creation of more accurate (e.g., error-free) electronic forms by centrally managing and applying digital data capture constructs. The result is a minimization of authoring errors that are likely to arise when manually applying the rules and experience constructs to the form fields field by field, and form by form. Numerous other such benefits, applications, and use cases will be apparent in light of this disclosure, and the present disclosure is not intended to be limited to any particular ones.

Numerous example variations and configurations will be apparent in light of this disclosure. According to some examples, computer-implemented methods to automatically generate an electronic form based on a paper form are described. An example computer-implemented method may include: identifying a current data field in a paper form to process; extracting a semantic meaning of the current data field; searching multiple data elements to identify a data element that semantically matches the current data field, each data element of the multiple data elements having associated therewith one or more digital data capture constructs; and responsive to identifying a semantically matching data element, generating a data field in the electronic form based on the semantically matched data element and the associated one or more digital data capture constructs, the generated data field in an electronic form corresponding to the current data field in the paper form.

In some examples, extracting the semantic meaning of the current data field may include identifying one or more keywords based on one or more of a caption of the current data field and a context of the current data field. In other examples, the search is performed using one or more keywords of the data field. In further examples, the one or more digital data constructs are provided by a user.

In some examples, the one or more digital data capture constructs includes a business rule. In other examples, the one or more digital data capture constructs includes a validation rule. In still other examples, the one or more digital data capture constructs includes a help text. In further examples, the one or more digital data capture constructs includes a user experience construct. In still further examples, the one or more digital data capture constructs includes a styling construct.

According to some examples, computer program products including one or more non-transitory machine readable mediums encoded with instructions that when executed by one or more processors cause a process to be carried out to automatically generate an electronic form based on a paper form are described. An example process may include: identifying a current data field in a paper form to process; extracting a semantic meaning of the current data field; searching multiple data elements for a data element that semantically matches the current data field, each data element of the multiple data elements having associated therewith one or more digital data capture constructs; and responsive to identifying a semantically matching data element, generating a data field in an electronic form based on the matched data element and the associated one or more digital data capture constructs, the generated data field in the electronic form corresponding to the current data field in the paper form.

In some examples, extracting the semantic meaning of the current data field may include identifying one or more keywords based on a label of the current data field. In other examples, extracting the semantic meaning of the current data field may include identifying one or more keywords based on a context of the current data field. In still other examples, the search is performed using one or more keywords of the current data field. In yet other examples, the one or more digital data capture constructs includes one or more of a business rule, a validation rule, a form object, a widget, a help text, a user experience construct, and a styling construct.

According to other examples, systems to provide automatic electronic form generation are described. An example system may include: one or more non-transitory machine readable mediums configured to store instructions; and one or more processors configured to execute the instructions stored on the one or more non-transitory machine readable mediums. Execution of the instructions by the one or more processors may cause the one or more processors to: identify a current data field to process, the current data field being a data field in a paper form; determine a semantic meaning of the current data field; search multiple data elements to identify a data element that semantically matches the current data field, each data element of the multiple data elements having associated therewith one or more digital data capture constructs; and responsive to identification of a semantically matching data element, generate a data field in an electronic form based on the matched data element and the associated one or more digital data capture constructs, the generated data field in the electronic form corresponding to the current data field in the paper form.

In some examples, the one or more non-transitory machine readable mediums may further sores instructions that, in response to execution by the one or more processors, cause the one or more processors to generate a keyword index that maintains a mapping of keywords and each data element of the multiple data elements, the keywords being descriptive of the semantic meaning of the data element to which the keywords are mapped. In other examples, the one or more digital data capture constructs includes a business rule. In still other examples, the one or more digital data capture constructs includes a form object. In yet other examples, the one or more digital data capture constructs includes a validation rule. In further examples, the one or more digital data capture constructs includes a styling construct.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to automatically generate a second form based on a first form, the method comprising:
   identifying a current data field in the first form;
   extracting a semantic meaning of the current data field;
   accessing a data element dictionary having stored therein a plurality of data elements, a plurality of keywords, and a plurality of digital data capture constructs, wherein a particular data element is associated with a particular keyword and a particular digital data capture construct, and wherein at least one of the digital data capture constructs defines an appearance of an associated data element when incorporated into the second form;
   searching for the particular keyword in the data element dictionary, wherein the particular keyword matches the extracted semantic meaning of the current data field;
   identifying the particular data element and the particular digital data capture construct that are associated with the particular keyword;
   responsive to identifying the particular data element, incorporating the particular data element into the second form, the particular data element in the second form corresponding to the current data field in the first form; and
   generating the second form, wherein the particular data element is generated to have an appearance that is defined by the particular digital data capture construct, and wherein the particular data element is associated with an empty data entry field that is configured to receive user input.

2. The method of claim 1, wherein extracting the semantic meaning of the current data field comprises identifying one or more target keywords based on one or more of a label of the current data field and a context of the current data field.

3. The method of claim 1, wherein
   extracting the semantic meaning of the current data field comprises identifying one or more target keywords based on one or more of a label of the current data field and a context of the current data field; and
   searching for the particular keyword in the data element dictionary comprises searching for the one or more target keywords of the current data field.

4. The method of claim 1, wherein at least one of the digital data capture constructs includes a business rule.

5. The method of claim 1, wherein at least one of the digital data capture constructs is provided by a user.

6. The method of claim 1, wherein at least one of the digital data capture constructs includes a validation rule.

7. The method of claim 1, wherein at least one of the digital data capture constructs includes a help text.

8. The method of claim 1, wherein at least one of the digital data capture constructs includes a user experience construct.

9. The method of claim 1, wherein at least one of the digital data capture constructs includes a styling construct.

10. A computer program product including one or more non-transitory machine readable mediums encoded with instructions that when executed by one or more processors cause a process to be carried out to automatically generate a second form based on a first form, the process comprising:
    identifying a current data field in the first form;
    extracting a semantic meaning of the current data field;
    accessing a data element dictionary having stored therein a plurality of data elements, a plurality of keywords, and a plurality of digital data capture constructs, wherein a particular data element is associated with a particular keyword and a particular digital data capture construct, and wherein at least one of the digital data capture constructs defines an appearance of an associated data element when incorporated into the second form;
    searching for the particular keyword in the data element dictionary, wherein the particular keyword matches the extracted semantic meaning of the current data field;
    identifying the particular data element and the particular digital data capture construct that are associated with the particular keyword;
    responsive to identifying the particular data element, incorporating the particular data element into the second form, the particular data element in the second form corresponding to the current data field in the first form; and
    generating the second form, wherein the particular data element is generated to have an appearance that is defined by the particular digital data capture construct, and wherein the particular data element is associated with an empty data entry field that is configured to receive user input.

11. The computer program product of claim 10, wherein extracting the semantic meaning of the current data field comprises identifying one or more target keywords based on a label of the current data field.

12. The computer program product of claim 10, wherein extracting the semantic meaning of the current data field comprises identifying one or more target keywords based on a context of the current data field.

13. The computer program product of claim 10, wherein
    extracting the semantic meaning of the current data field comprises identifying one or more target keywords based on one or more of a label of the current data field and a context of the current data field; and
    searching for the particular keyword in the data element dictionary comprises searching for the one or more target keywords of the current data field.

14. The computer program product of claim 10, wherein at least one of the digital data capture constructs includes one or more of a business rule, a validation rule, a form object, a widget, a help text, a user experience construct, and a styling construct.

15. A system to provide automatic electronic form generation, the system comprising:
    one or more non-transitory machine readable mediums configured to store instructions; and
    one or more processors configured to execute the instructions stored on the one or more non-transitory machine readable mediums, wherein execution of the instructions causes the one or more processors to:
    identify a current data field in a first form;
    determine a semantic meaning of the current data field;
    access a data element dictionary having stored therein a plurality of data elements, a plurality of keywords, and a plurality of digital data capture constructs, wherein a particular data element is associated with a particular keyword and a particular digital data capture construct, and wherein at least one of the digital data capture constructs defines an appearance of an associated data element;

search for the particular keyword in the data element dictionary, wherein the particular keyword matches the semantic meaning of the current data field;

identify the particular data element and the particular digital data capture construct that are associated with the particular keyword;

responsive to identifying the particular data element, incorporate the particular data element into a second form, the particular data element in the second form corresponding to the current data field in the first form; and generate the second form, wherein the particular data element is generated to have an appearance that is defined by the particular digital data capture construct, and wherein the particular data element is associated with an empty data entry field that is configured to receive user input.

16. The system of claim 15, wherein the particular keyword is descriptive of the semantic meaning.

17. The system of claim 15, wherein at least one of the digital data capture constructs includes a business rule.

18. The system of claim 15, wherein at least one of the digital data capture constructs includes a form object.

19. The system of claim 15, wherein at least one of the digital data capture constructs includes a validation rule.

20. The system of claim 15, wherein at least one of the digital data capture constructs includes a styling construct.

* * * * *